C. PARHAM.
Sewing Machine.
No. 1,562. Reissued Nov. 3, 1863.
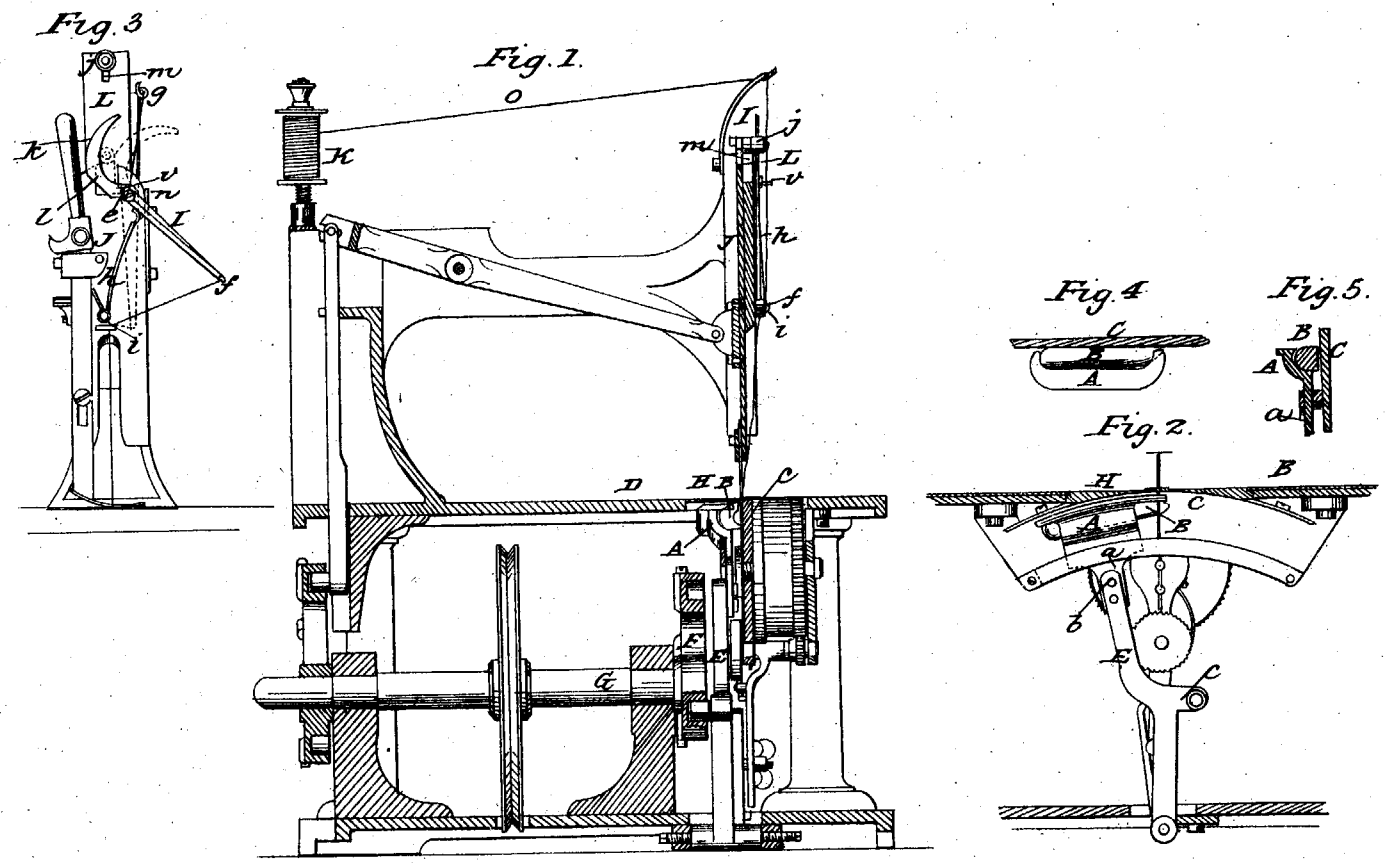
N. PETERS, Photo-Lithographer, Washington, D. C.

UNITED STATES PATENT OFFICE.

CHARLES PARHAM, OF PHILADELPHIA, PENNSYLVANIA.

IMPROVEMENT IN SEWING-MACHINES.

Specification forming part of Letters Patent No. 11,971, dated November 21, 1854; Reissue No. 1,562, dated November 3, 1863.

*To all whom it may concern:*

Be it known that I, CHARLES PARHAM, of Philadelphia, Pennsylvania, did obtain Letters Patent dated the 21st day of November, 1854, for Improvements in Sewing-Machines, which Letters Patent I now deem inoperative and invalid by reason of a defective and insufficient specification; and I do hereby declare the following to be a full, clear, and exact description of the said invention, reference being had to the accompanying drawings, and to the letters of reference marked thereon.

My invention relates to improvements in that class of sewing-machines in which a lock-stitch is produced by causing a shuttle carrying the under or shuttle thread to pass through a loop of the upper thread carried by an eye-pointed needle; and my improvements consist, first, in so forming and constructing the shuttle-driver of a lock-stitch sewing machine that while it performs the required duty of driving the shuttle it serves to maintain the latter in the desired proximity to a guide-plate, as described hereinafter; secondly, in the combination of a driver, shuttle, and stationary guide-plate, the whole being formed and arranged, substantially as described hereinafter, so as to retain the shuttle in its proper position during its flight.

In order to enable others skilled in the art to make and use my invention, I will now proceed to describe its construction and operation.

On reference to the accompanying drawings, which form part of this specification, Figure 1 is a vertical section of a sewing-machine with my improvements; Fig. 2, a rear view of the device for supporting and operating the shuttle; Fig. 3, a front view of the thread-controlling device; Fig. 4, a top view of the shuttle and carrier, and Fig. 5 a transverse section of Fig. 4.

Similar letters refer to similar parts throughout the several views.

All the parts which are not herein described are or may be considered the same as the corresponding parts of well-known machines, as it is only necessary to illustrate my improvements to describe those parts of the machine to which they bear intimate relation.

A is the shuttle-driver, and B the shuttle, C being a plate permanently secured to the under side of the table D, and serving as the guide for the face of the shuttle. The shuttle-driver A is open at the top, and is of the form best observed on reference to Fig. 5, the inside of the driver conforming or nearly conforming in shape to that of the back of the shuttle, and serving to maintain the face of the latter in as close proximity to the plate C as described, while the bottom of the shuttle in the present instance rests on the ledge *x* of the driver, the longitudinal form of the driver, as seen in Fig. 4, being such that, although open at the ends in order to pass outside the loop and permit the shuttle to pass through the same, it will serve to properly confine the shuttle.

The shuttle-driver is secured by bolts *b b* to the arm E, which is pivoted at *d* to the bed-plate of the machine, and which derives the vibrating motion necessary for the proper flight of the shuttle from a cam, F, on the main shaft G, which acts upon a stud projecting from the arm. The arm or the shank of the driver passes through and vibrates in a slotted guide-plate secured to the plate C. An arched plate, H, fits on the table D, and is so arranged in respect to the shuttle that the latter cannot be tipped up at the ends.

It will be understood that the shuttle and its driver are arched, for the reason that they move, in the present instance, in the arc of a circle of which the pivot *d* is the center.

It will be seen that the shuttle is confined in front by the plate C, at the back by the driver A, above by the arched plate H, and below by the ledge *x* of the driver. Owing to the shuttle being loosely confined and to the rounded form of all the edges and exposed parts of the driver, the shuttle is allowed to pass freely through the loop without being obstructed by the driver, which passes freely outside the loop. As the shuttle moves with the driver, the presence of lubricating substances between the driver and shuttle is unnecessary, so that the loop of thread through which the shuttle passes cannot become soiled. Whatever oil may be required between the face of the shuttle and the plate C cannot soil that portion of the thread which passes between these surfaces, inasmuch as the thread is protected by the needle, which operates in a recess in the face of th guide-plate.

The thread-controlling device consists of a lever, I, hung to a fulcrum-pin, *e*, secured to the head in which the needle-bar L reciprocates. The needle-thread passes from the spool K through an eye, *g*, on a stationary arm secured to the head J, thence through an eye, *v*, on the fulcrum-pin *e*, thence through an eye, *f*, at the lower end of the long arm of the lever I, and thence through an eye, *i*, on the lower portion of the head J, and thence through the eye of the needle to the fabric. The lower arm of the lever I is acted on by a spring, *h*, which tends to force the arm outward to the position shown in Fig. 3, when the upper arm of the lever is not influenced by a roller, *j*, which is hung loosely to a pin on the upper end of the needle-bar L. When the point of the needle is in the act of entering the fabric the roller *j* comes in contact with the curved portion *k* of the upper arm of the lever, and as the needle continues to descend the roller acts on this upper arm and quickly moves the lever to the nearly vertical position shown by red lines, Fig. 3. In this position the lever is detained, owing to the roller being in contact with the straight portion *l* of the upper arm, thereby maintaining the thread perfectly slack for a sufficient length of time to enable the shuttle to pass freely through the loop. As the needle rises and the roller *j* again comes in contact with the rounded portion *k* of the upper arm of the lever, the latter, through the action of the spring *n*, moves outward to the position shown in Fig. 3, thereby taking up the slack thread and assisting the needle to complete and tighten the stitch.

The point in the needle's movement at which it may be desirable to slacken the thread and to commence the tightening of the same may be regulated by raising or lowering the pin which forms the axis of the roller *j* in a slot formed in the needle-bar for the reception of the said pin, the raising of the roller having the effect of slackening the thread later and tightening the same earlier, and the lowering of the roller having the opposite effect.

The proper movement of the lever to take up the slack of the needle-thread may be regulated to the greatest nicety by the adjustable stop *n*, which is secured to one side of the head J, and which arrests the outer movement of the lower arm of the lever. On raising this stop the lever is allowed a greater amount of movement, and the stitch is thereby drawn tighter, and on lowering the stop the movement of the lever is diminished, and the stitch is consequently left slacker. The arrangement of eyes through which the thread passes to the eye of the needle is such that the thread is always under the proper control of the lever I, while the eye *i* is so situated in respect to the needle that the latter cannot be sprung laterally on taking up the slack.

It will be observed that what I have termed the "driver" A performs three duties: First, it serves to maintain the face of the shuttle in as close proximity to the plate C as desirable; secondly, it serves to support the shuttle; and, thirdly, it acts, as its name designates, as the shuttle-driver.

It is obvious that the shuttle-driver A, shuttle B, and plate C may be shaped and arranged for the shuttle to operate in a right line in place of a curved one, as specified, and that the driver may be actuated by mechanism other than that described, and that the driver may still perform a portion or all of the above-described duties. For instance, the driver, whether it moves in the arc of a circle or in a right line, may be made to perform the double duty of driving the shuttle and maintaining it in the desired proximity to the plate C, while a narrow ledge on the plate may be arranged as a support for the shuttle, although I prefer to so form the driver that it will serve both as a support for the shuttle and as a means of maintaining it in proximity to the plate. In either case, however, the usual channel or shuttle-race, which guides the shuttle both vertically and laterally, and which demands such lubrication as may tend to soil the thread, is dispensed with.

I wish it to be understood that I do not desire to claim broadly the use of a lever for so controlling the needle-thread that it will give out the desired slack for forming the necessary loop and take up the slack; but

I claim as my invention and desire to secure by Letters Patent—

1. So forming and constructing the shuttle-driver of a sewing-machine that while it performs the required duty of driving the shuttle it serves to maintain the latter in the desired proximity to the plate C, as set forth.

2. The combination of the driver A, shuttle B, and stationary plate C, the whole being formed and arranged, substantially as described, so as to retain the shuttle during its flight in its proper position, for the purpose specified.

In testimony whereof I have signed my name to this specification before two subscribing witnesses.

CHAS. PARHAM.

Witnesses:
HENRY HOWSON,
JOHN WHITE.